US 9,967,102 B2

United States Patent
Osborne et al.

(10) Patent No.: US 9,967,102 B2
(45) Date of Patent: May 8, 2018

(54) MANAGING TRANSFER OF DEVICE OWNERSHIP

(71) Applicant: International Business Machines Corporation, Armonk, NY (US)

(72) Inventors: Michael C. Osborne, Richterswil (CH); Elaine R. Palmer, Hanover, NH (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 14/974,649

(22) Filed: Dec. 18, 2015

(65) Prior Publication Data
US 2017/0180132 A1    Jun. 22, 2017

(51) Int. Cl.
*G06F 11/00*    (2006.01)
*H04L 9/32*    (2006.01)
*H04L 9/06*    (2006.01)

(52) U.S. Cl.
CPC .......... *H04L 9/3247* (2013.01); *H04L 9/0631* (2013.01); *H04L 9/3263* (2013.01)

(58) Field of Classification Search
CPC .... H04L 9/3247; H04L 9/0631; H04L 9/3263
USPC .................... 713/176, 168; 726/34
See application file for complete search history.

(56) References Cited

U.S. PATENT DOCUMENTS

| | | | | |
|---|---|---|---|---|
| 2004/0054849 | A1* | 3/2004 | Deenadhayalan | G06F 11/1076 711/112 |
| 2005/0102546 | A1* | 5/2005 | Patchen | G06F 9/3863 713/500 |
| 2009/0129586 | A1* | 5/2009 | Miyazaki | H04L 9/00 380/28 |
| 2009/0316907 | A1 | 12/2009 | Cachin et al. | |

(Continued)

FOREIGN PATENT DOCUMENTS

WO    0129777 A1    4/2001

OTHER PUBLICATIONS

Abyaneh, "On the Privacy of Two Tag Ownership Transfer Protocols for RFIDs", IEEE 2011 International Conference for Internet Technology and Secured Transactions (ICITST), Dec. 11-14, 2011, pp. 683-688.

(Continued)

*Primary Examiner* — Aravind Moorthy
(74) *Attorney, Agent, or Firm* — Yee & Associates, P.C.; Jeffrey S. LaBaw

(57) ABSTRACT

Managing transfer of device ownership is provided. A digitally signed state change request for a device that includes at least one of a new device owner, a new designated successor device owner, and a new device ownership reversibility control bit is accepted. A stored state for the device that includes at least one of a current device owner, a previous device owner, a designated successor device owner, and a current device ownership reversibility control bit is read. The previous device owner is replaced with the (Continued)

current device owner, the current device owner is replaced with the new device owner, the designated successor device owner is replaced with the new designated successor device owner, and the new device ownership reversibility control bit is set in response to the new device ownership reversibility control bit being included in the digitally signed state change request.

20 Claims, 12 Drawing Sheets

(56) References Cited

U.S. PATENT DOCUMENTS

| | | | | |
|---|---|---|---|---|
| 2011/0113256 | A1* | 5/2011 | Marinet | G06F 21/62 |
| | | | | 713/189 |
| 2012/0117321 | A1* | 5/2012 | Watanabe | G06F 11/2092 |
| | | | | 711/113 |
| 2012/0179918 | A1 | 7/2012 | Haas et al. | |
| 2014/0280812 | A1* | 9/2014 | Bealkowski | H04L 41/082 |
| | | | | 709/223 |
| 2016/0364787 | A1* | 12/2016 | Walker | G06Q 30/0635 |
| 2016/0380985 | A1* | 12/2016 | Chhabra | H04L 67/146 |
| | | | | 713/171 |
| 2017/0046525 | A1* | 2/2017 | Balinsky | G06F 9/38 |

OTHER PUBLICATIONS

Benadijila et al., "Caml Crush: a PKCS#11 Filtering Proxy", 13th International Smart Card Research and Advanced Application Conference (CARDIS 2014), Nov. 5-7, 2014, 16 pages.
Bitcoin Wiki, "Fidelity Bonds", dated Jul. 25, 2013, 4 pages. Accessed Dec. 16, 2015, https://en.bitcoin.it/wiki/Fidelity_bonds.
Bitcoin Wiki, "Smart Property", dated Jul. 31, 2015, 5 pages. Accessed Dec. 16, 2015, 2 pages, https://en.bitcoin.it/wiki/Smart_Property.
Cooper et al., "Internet x.509 Public Key Infrastructure Certificate and Certificate Revocation List (CRL) Profile", Network Working Group Request for Comments 5280, May 2008, 151 pages.
Duebendorfer et al., "Why Silent Updates Boost Security", ETH Tech Report TIK 302, May 2009, 9 pages.
National Institute of Standards Technology Computer Security Division, "Randomness Beacon", beacon.nist.gov/home, May 2014, 2 pages.
Bsi, "Technical Guideline TR-03110-3: Advanced Security Mechanisms for Machine Readable Travel Documents Part 3: Comment Specifications", Version 2.10, Mar. 20, 2012, 82 pages.
Holt, "Logcrypt: Forward Security and Public Verification for Secure Audit Logs", Proceeding ACSW Frontiers '06 Proceedings of the 2006 Australasian Workshops on Grid Computing and E-Research, vol. 54, Jan. 1, 2006, pp. 203-211.
Housley, "Cryptographic Message Syntax (CMS)", Network Working Group Request for Comments 3852, Jul. 2004, 112 pages. https://tools.ietf.org/html/rfc3852.
International Civil Aviation Organization, "Part 7: Machine Readable Visas", In: Machine Readable Travel Documents, Seventh Edition, Secretary Attorney General, lntemational Civil Aviation Organization, Quebec, 2015, 60 pages.
Li et al., "Secure RFID Ownership Transfer Protocols", In: Information Security Practice and Experience, vol. 7863, Deng, Feng (Eds.), Springer Berlin Heidelberg, 2013, pp. 189-203.
Nakamoto, "Bitcoin: A Peer-to-Peer Cash System", White Paper, Oct. 2008, 9 pages. http://www.bitcoin.org/bitcoin.pdf.
Nussel, "CA-Certificates: Utilities for System Wide CA Certificate Installation", White Paper, Oct. 2013, 2 pages. github.com/openSUSE/ca-certificates/blob/master/README.
Osaka et al., "An Efficient and Secure RFID Security Method with Ownership Transfer", In: Computational Intelligence and Security, vol. 4456, Wang, Cheung, Liu (Eds.), Springer Berlin Heidelberg, 2007, pp. 1090-1095.
Red Hat Corporation, "CA Certificates Security Update", https://rhn.redhat.com/errata/RHSA-2013-1866.html, Dec. 20, 2013, 5 pages.
Samuel et al., "Survivable Key Compromise in Software Update Systems", Proceedings of the 17th ACM Conference on Computer and Communications Security, Oct. 4-8, 2010, 12 pages.

\* cited by examiner

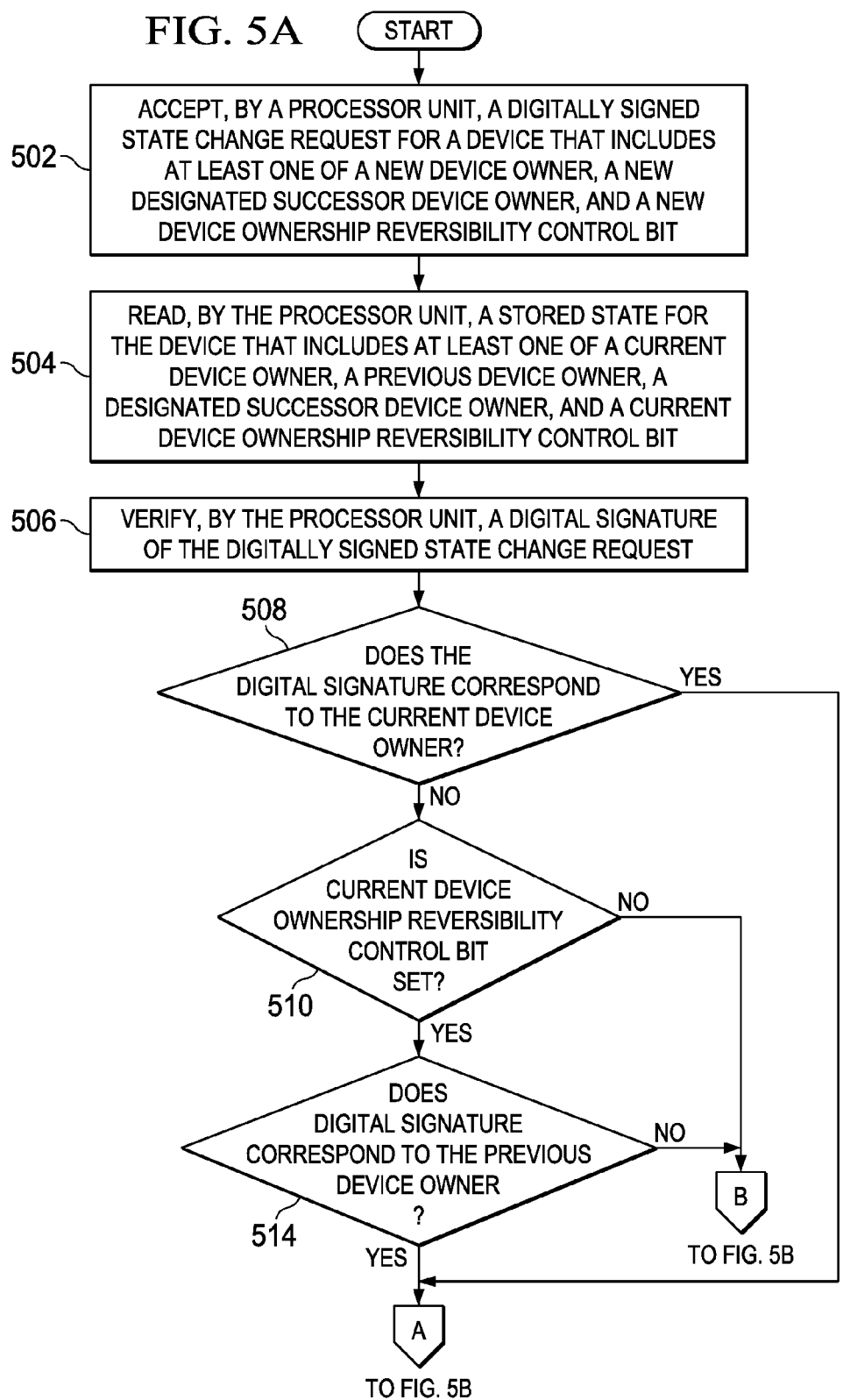

MANAGING TRANSFER OF DEVICE OWNERSHIP

BACKGROUND

1. Field

The disclosure relates generally to data processing devices and more specifically to managing transfer of ownership of a cryptographically controlled data processing device using public keys corresponding to current, previous, and designated successor owners.

2. Description of the Related Art

Asymmetric public-key cryptography, where the non-sensitive half of each "keypair" may be freely published, allows verification of ownership based on non-sensitive information. However, securely transferring ownership between public keys, or digital certificates representing the public keys, may be challenging if the final target public key is not yet known at the time of transfer, for example. Considerable variation in the degree of synchronization exists between source and target public keys depending on temporal availability and the level of cooperation between the owners of the public keys. Many current schemes are optimized for the closely synchronized online case and may not adapt to looser coordination between source and target public keys.

SUMMARY

According to one illustrative embodiment, a computer-implemented method for managing transfer of device ownership is provided. A processor accepts a digitally signed state change request for a device that includes at least one of a new device owner, a new designated successor device owner, and a new device ownership reversibility control bit. The processor reads a stored state for the device that includes at least one of a current device owner, a previous device owner, a designated successor device owner, and a current device ownership reversibility control bit. The processor replaces the previous device owner with the current device owner, replaces the current device owner with the new device owner, replaces the designated successor device owner with the new designated successor device owner, and sets the new device ownership reversibility control bit in response to the new device ownership reversibility control bit being included in the digitally signed state change request. According to other illustrative embodiments, a data processing system and computer program product for managing transfer of device ownership are provided.

BRIEF DESCRIPTION OF THE DRAWINGS

FIGS. 5A-5B are a flowchart illustrating a process for managing transfer of device ownership in accordance with an illustrative embodiment;

DETAILED DESCRIPTION

Figure 1:
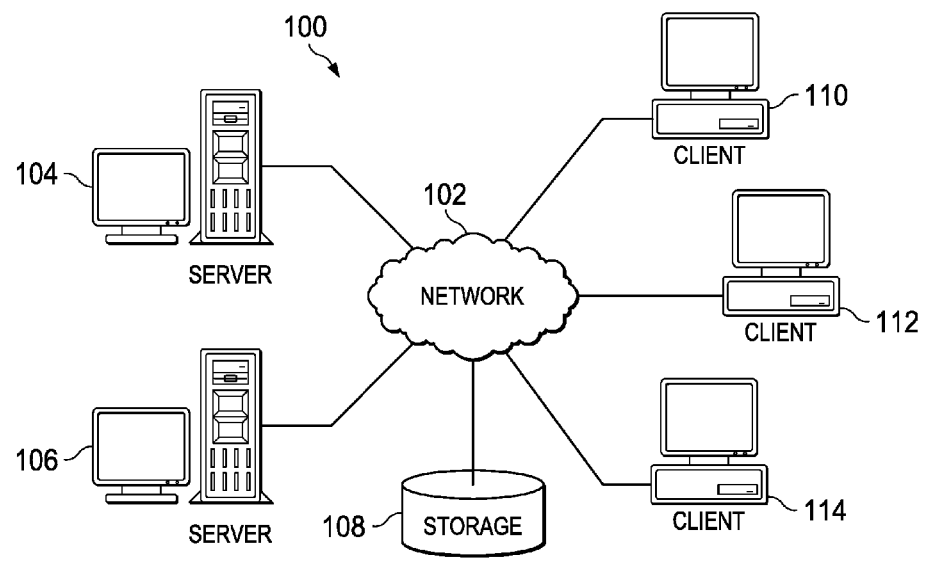
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
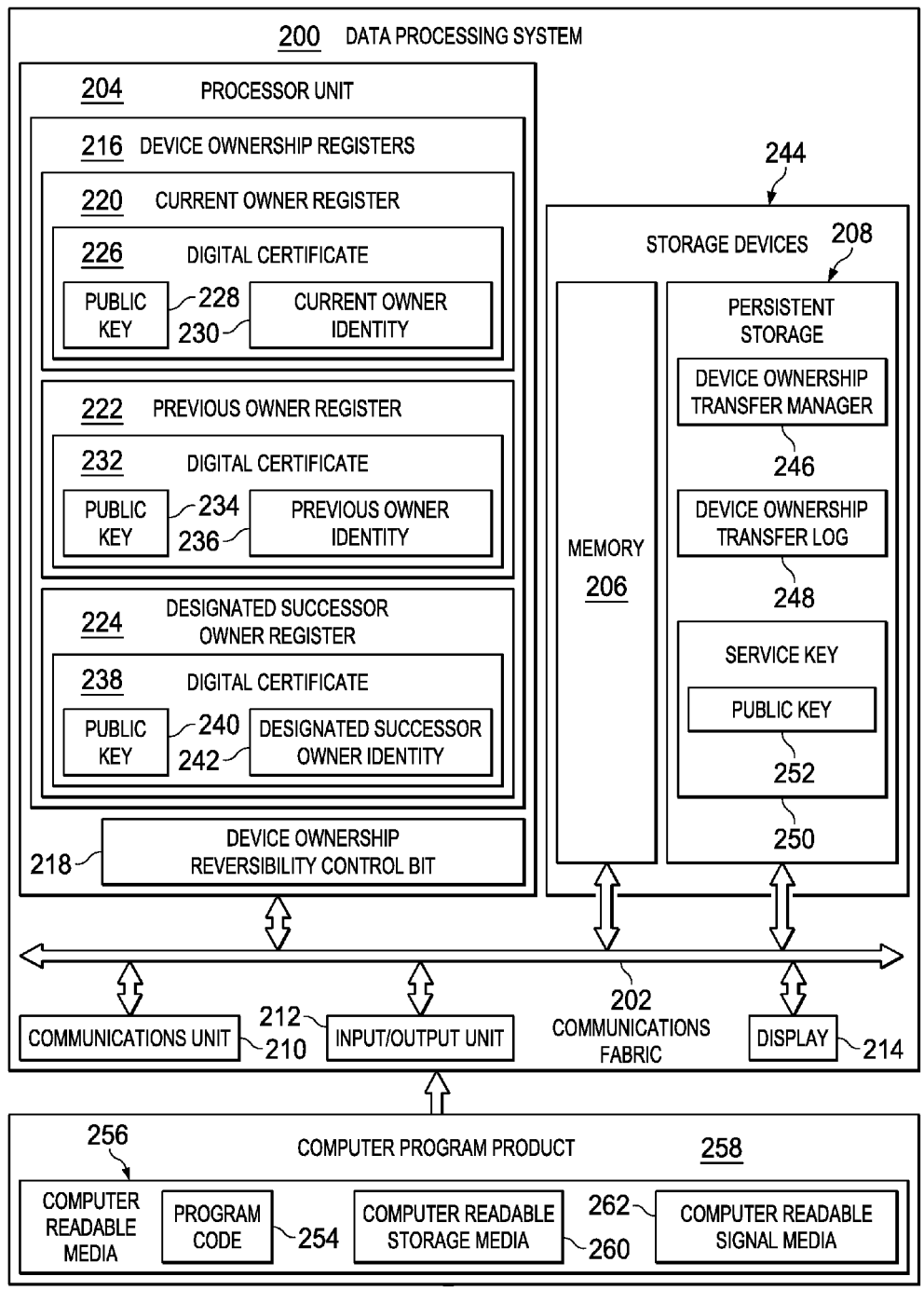
FIG. 2 a diagram of a data processing system in which illustrative embodiments may be implemented.

With reference now to the figures, and in particular, with reference to FIGS. 1 and 2, diagrams of data processing environments are provided in which illustrative embodiments may be implemented. It should be appreciated that FIGS. 1 and 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, the data processing systems, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of services that monitor, track, and record transfer of ownership of cryptographically protected client data processing devices. A cryptographically protected data processing device may be, for example, an entire data processing system, such as a network computer, or a portion of a data processing system, such as a graphics processor unit, a memory controller, a safety switch within a nuclear power plant, a door lock in an aircraft, or a component of an automobile's air bag system. It should be noted that each device on the network also may monitor, track, and record transfer of its ownership, without the aid of a central server. In addition, computer readable instructions for carrying out operations of different illustrative embodiments may be pre-programmed into a device (i.e., not downloaded). Further, one illustrative embodiment may be a subcomponent of a chip embedded with hundreds of different components of a car or an airplane, for example, controlling who has ownership authority over each different component.

Client 110, client 112, and client 114 also connect to network 102. Clients 110, 112, and 114 represent subscribing cryptographically protected client data processing devices to the set of services provided by server 104 and server 106. Server 104 and server 106 also may provide information, such as boot files, operating system images, virtual machine images, and software applications to clients 110, 112, and 114.

In this example, clients 110, 112, and 114 are illustrated as computers, such as, for example, network computers, hardware security modules, or desktop computers. However, it should be noted that clients 110, 112, and 114 are intended as examples only. In other words, clients 110, 112, and 114 may represent other types of data processing systems, subsystems, and devices, such as, for example, laptop computers, tablet computers, handheld computers, smart phones, smart watches, personal digital assistants, gaming devices, adapters, controllers, sensors, actuators, switches and the like.

Storage 108 is a network storage device capable of storing any type of data in a structured format or an unstructured format. Data stored in storage 108 may include, for example, device ownership transfer managers, device ownership transfer logs, lists of device owners with corresponding identification information, and lists of cryptographically protected data processing devices with corresponding identification information. Further, storage unit 108 may store other types of data, such as authentication or credential data that may include user names, public keys, digital certificates, passwords, and biometric data associated with system administrators, registered devices, and registered device owners.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In addition, data processing system 200 may be a cryptographically protected data processing device. In this illustrative example, data processing system 200 includes communications fabric 202, which provides communications between secure central processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Furthermore, processor unit 204 may include central processing unit technology that is capable of processing encrypted data corresponding to a set of public keys owned by a set of owners of data processing system 200 to protect the confidentiality and integrity of the data and to protect data processing system 200 from being controlled by unauthorized users or would-be owners. In this example, processor unit 204 includes device ownership registers 216 and device ownership reversibility control bit 218.

Device ownership registers 216 represent a set of registers that is local storage on processor unit 204 holding owner authentication data for processing by processor unit 204. In addition, device ownership registers 216 may be persistent local storage. In an alternative illustrative embodiment, device ownership registers 216 may be located in persistent storage 208.

In this example, device ownership registers 216 include current owner register 220, previous owner register 222, and designated successor owner 224. However, illustrative embodiments are not limited to such. In other words, device ownership registers 216 may include more or fewer registers. For example, an alternative illustrative example may combine two or more registers into one register or add another register not illustrated. Further, an alternative illustrative embodiment may not include a designated successor owner register, for example.

In this example, current owner register 220 includes digital certificate 226. Digital certificate 226 includes public key 228 and current owner identity 230. Public key 228 corresponds to the current owner of data processing system 200. It should be noted that corresponding private keys to public keys are not present in data processing system 200 and may be stored in a secure signing device, such as, for example, server 104 in FIG. 1. Current owner identity 230 is data that particularly identifies the current owner of data processing system 200. It should be noted that illustrative embodiments may store a hash of information contained in a digital certificate instead of all of the information. Further, alternative illustrative embodiments may utilize digital certificate issuer and serial number data or other representation of a device owner instead of utilizing a digital certificate.

In this example, previous owner register 222 includes digital certificate 232. Digital certificate 232 includes public key 234 and previous owner identity 236. Public key 234 corresponds to the previous owner of data processing system 200. Previous owner identity 236 is data that particularly identifies the previous owner of data processing system 200. However, it should be noted that previous owner register 222 may not contain any data because data processing system 200 may not have had an authenticated previous owner.

In this example, designated successor owner register 224 includes digital certificate 238. Digital certificate 238 includes public key 240 and designated successor owner identity 242. Public key 240 corresponds to the designated successor owner of data processing system 200. Designated successor owner identity 242 is data that particularly identifies the designated successor owner of data processing system 200. However, it should be noted that designated successor owner register 224 may not contain any data because data processing system 200 may not have a designated successor owner to take control of data processing system 200. If, however, designated successor owner register 224 does include data corresponding to digital certificate 238, then processor unit 204 will reject ownership control transfer of data processing system 200 to any other entity except the entity corresponding to public key 240 and designated successor owner identity 242. Typically, the current owner corresponding to public key 228 and current owner identity 230 designates the next entity that is to take ownership control of data processing system 200.

Device ownership reversibility control bit 218 is a bit or flag in processor unit 204, which when set indicates to processor unit 204 that ownership control of data processing unit 200 may pass back to the now previous device owner indicated in previous owner register 222. Typically, the current owner of data processing system 200 sets device ownership reversibility control bit 218 prior to transferring ownership control of data processing system 200 to the next owning entity. In an alternative illustrative embodiment, processor unit 204 may include a Boolean attribute to indicate reversibility of device ownership instead of using device ownership reversibility control bit 218.

Memory 206 and persistent storage 208 are examples of storage devices 244. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores device ownership transfer manager 246, device ownership transfer log 248, and service key 250. Device ownership transfer manager 246 protects data processing system 200 from unauthorized entities from taking control of data processing system 200 by controlling transfer of device ownership between entities using data in device ownership registers 216 executing on processor unit 204. It should be noted that even though device ownership transfer manager 246 is illustrated as residing in persistent storage 208, in an alternative illustrative embodiment, device ownership transfer manager 246 may be a separate component of data processing system 200. For example, device ownership transfer manager 246 may be a hardware component coupled to communication fabric 202 or a combination of hardware and software components. In an alternative embodiment, device ownership transfer manager 246 may be located in firmware resident on processor unit 204.

Device ownership transfer manager 246 records the transfer of ownership of data processing system 200 between entities in device ownership transfer log 248. Device ownership transfer log 248 is an auditable record of device ownership transfer. In addition, device ownership transfer log 248 may record other events. For example, device ownership transfer log 248 may record software downloads to data processing system 200, hardware components added to or removed from data processing system 200, and the entity or entities responsible for each particular event.

Service key 250 is a specially marked digital certificate that includes public key 252 and is established between entities who need dynamic switching between online and offline ownership transfers. Service key 250 may approximate a "certificate authority," as service key 250 may digitally sign ownership transition certificates from service key 250, itself, to an intended successor owner entity.

Device ownership transfer manager 246 may generalize to multiple cryptographically-controlled environments, such as, for example, those requiring multiple digital signatures to authenticate critical transfer of device ownership commands. Such device ownership transfer policies may be represented by additional attributes, such as, for example, those attributes defining a maximum number and a minimum number of required digital signatures. Device ownership transfer manager 246 assumes that the current owner of data processing system 200 will authenticate an incoming device ownership transfer command (i.e., a device ownership state-changing command).

In typical digital certificate management scenarios, a transfer of device ownership command may take the form of a "transition certificate" designating a new owner of the device as an authorized device owner, which is digitally signed by the current owner. Device ownership transfer manager 246 may maintain a full history of past device owners in device ownership transfer log 248. Device ownership transfer manager 246 may maintain a one-way chained digital certificate list in parallel with the ownership information stored in device ownership registers 216 and validate against it. Because such digitally signed certificate chains may be validated offline, device ownership transfer manager 246 may let another entity, such as an entity associated with server 106 in FIG. 1, aggregate past device ownership history while device ownership transfer manager 246 only maintains the set of three active digital certificates 226, 232, and 238 corresponding to the current owner, the previous owner, and the designated successor owner, respectively.

Typical scenarios simply combine available device ownership registers to describe the spectrum of online to offline device ownership transfers. When transferring device ownership control directly to a known entity, device ownership transfer manager 246 may issue a transition certificate designating the known entity as the next owner of the device. It should be noted that this step of issuing a transition certificate requires ownership of the designated device target, which in this case is data processing system 200. In an indirect device ownership transfer, such as, for example, when entities share a "service key," which may in turn issue digital certificates to other digital certificates, registering the service key as a device owner allows cooperation between entities to hand over device ownership control to a then-unknown successor owner. Because device ownership transfer manager 246 maintains a single log entry of past history (i.e., previous owner information in previous owner register 222), the designated successor owner may still verify who authorized the device ownership transfer to service key ownership.

Because service keys may be access-controlled and ownership of the service keys shared between source and target entities, the service keys may provide sufficient trust for both entities. Illustrative embodiments are most effective if a service key is known to the source entity, and is controlled only by the target entity, as this allows some separation of duty for the source entity. In such a setup, the service key may approximate a "certificate authority," as the service key may then digitally sign device ownership transition certificates from the service key, itself, to an intended target entity. An intended target entity may explicitly acknowledge taking ownership of the device. For example, when device ownership transfer manager 246 transfers device ownership control directly to a known, particular entity, that particular entity may explicitly issue a current device ownership transition certificate to that particular entity, itself. Device ownership transfer manager 246 may utilize this redundant device ownership transfer transaction as an "audit beacon," allowing the device ownership transfer event to acknowledge the arrival of the device at the target entity, or a similar "ingress" scenario. If the digital signature of the device ownership transfer event includes some time-constrained metadata, then device ownership transfer manager 246 may reliably demonstrate the actual time when device ownership has been acknowledged by the target entity.

Cryptographically-secured services publishing trust anchors exist. These cryptographically-secured services generally publish auditable public information, coupled with timestamps, ready to be inserted into audit chains of others to demonstrate provenance. However, device ownership transfer manager 246 may force the device recipient entity to redundantly transfer device ownership to the device recipient entity, itself, in an auditable manner to generate a clearly delineated end to the previous owner's control over the device and may include some time-bound metadata in the device ownership transfer log record. Particularly, device ownership transfer manager 246 may force the device recipient entity to generate a digital signature that includes some "fresh" information and so mark the time of device ownership transfer in the device ownership transfer log record.

Managing device ownership reversibility control bit 218, a device source entity may demonstrably "release" the device from the source entity's control, such as, for example, when the source entity transfers device ownership to a service key. If the source entity lacks access to the private key of the service key, then the source entity may prove how and when the source entity released device ownership, such as, for example, when the source entity moves the device from stock under the source entity's ownership, to stock under a device recipient entity.

While device ownership transfer manager 246 only maintains tuples of current owner, previous owner, and designated successor owner, alternative illustrative embodiments may aggregate the respective digital certificates of each of the owners, and details of device ownership transfer events linking the owners, into a global device ownership transfer event chain. Because digital certificates may be verified based on public information, alternative illustrative embodiments may easily traverse such device ownership chains of corresponding digital certificates, even if some of the information in a device ownership chain is archived outside the device. The presence of digital signatures enables device ownership transfer manager 246 to detect modification by unauthorized entities, while device ownership transfer manager 246 may reconstruct each device ownership state of current owner, previous owner, and designated successor owner using information in device ownership registers 216.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 244, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that most device ownership trust-migration schemes fail to adapt to dynamic policies, as policy choices influence data representation. As an example, an online device ownership transfer scheme assumes interactive cooperation between the device source entity and the intended device recipient entity and accommodates offline digital certificate replacement only with difficulty. Transfer schemes based on offline actions, such as digital certificate-based authentication, are difficult to adapt when the specific time of transferring device ownership is to be audited. For example, the entire notion of digital certificates is essentially an approximation for offline processing and, therefore, does not easily convey timing of device ownership transfer-related events.

Illustrative embodiments show how a set of device ownership registers, which store information, such as digital certificates identifying public keys and a few related attributes, allows illustrative embodiments to represent all relevant categories of device ownership transfer flows. Illustrative embodiments describe completely synchronized, interactive device ownership transfers and unsynchronized, loosely coupled device ownership transfers using the same set of cryptographic primitives, while still maintaining control over the process. In addition, illustrative embodiments describe reversible device ownership transfers and also describe abrogative actions where well-defined termination of device ownership needs to be demonstrated. This flexibility allows illustrative embodiments to accommodate a wide range of device ownership control policies, even during the entire lifetime of the same cryptographically controlled data processing device.

Illustrative embodiments may be used to manage non-repudiable device ownership transfers between cooperating entities. An example application of such device ownership transfer is an auditable transfer of device ownership. Illustrative embodiments demonstrate how the use of digital certificate replacement generates device ownership transfer records for high-assurance environments. Illustrative embodiments generate an auditable device ownership transfer event log to clearly delineate stages of the device ownership transfer process.

Illustrative embodiments describe device ownership trust-migration procedures using a pair of current/previous device owner entity identifications and other information. Specifically, illustrative embodiments only need to represent the current owner, the previous owner, and possibly a designated successor owner. However, illustrative embodiments do not need to represent a full device ownership history. Because owner-identifying fields already exist in many standard formats, such as digital certificates, illustrative embodiments may be instantiated over existing systems without changing current functionality or modifying state machines of deployed systems.

In addition, illustrative embodiments may migrate trust to a currently unknown successor device owner, while still allowing the unknown successor device owner to verify the transfer of device ownership using an additional procedural step. Generally, illustrative embodiments may accommodate this trust migration through the use of a service key established between pairs of counterparty owners, with the final device recipient owner transferring device ownership to the final device recipient owner through the service key. The service key serves as a "proxy" between the source device owner and recipient device owner and may implement the "role" of current device owner during device transit. Illustrative embodiments assume that the pair of participating entities establishes the service key. Because the service key is unique only in its temporary nature, the service key is represented as a regular public key and digital certificate. Because the pair of participating entities establishes the service key offline and marks the corresponding digital certificate as special, the presence of the service key marks device ownership control as temporary during device transit, but does not otherwise impact anything. Because illustrative embodiments do not require a direct handshake between the current device owner and the designated successor device owner, illustrative embodiments may transfer device ownership in a trustworthy manner without requiring strong owner-successor coordination. Specifically, illustrative embodiments do not use data available only in interactive online "handshakes." The previously established service key is capable of online operations, if needed, because the presence of the service key allows temporal decoupling of the public key corresponding to the source device owner and the public key corresponding to the recipient device owner.

Illustrative embodiments allow device ownership rollback as an optional, allowing the previous owner to recover control over a cryptographically controlled data processing device that was released from the previous owner's control only tentatively. Illustrative embodiments represent device ownership rollback as an additional device ownership reversibility control bit or flag, which indicates that the previous owner, who would still be shown as the previous owner in the set of device ownership registers, may be allowed to restore ownership of the cryptographically controlled data processing device. A typical implementation of the rollback would "revoke" the last device ownership transfer message, which would mark the device as no longer being controlled by its then current owner. An example application of device ownership rollback would be in a joint manufacturing endeavor, where the device may be prepared for final customization by a subsequent device owner, while the previous device owner retains the capability to regain ownership and reprogram the device, a scenario useful in joint/outsourced manufacturing. Conversely, illustrative embodiments also allow the current device owner to conspicuously relinquish ownership of the device, demonstrating the current device owner's incapability of restoring control over the device to the subsequent device owner, which is a cryptographic equivalent of proving a negative statement.

Because illustrative embodiments may be implemented based on current/previous device owner identities, such as their corresponding digital certificates, illustrative embodiments only need a modest, fixed and predefined amount of state to inspect a chain of device ownership transitions relevant to the state machine of illustrative embodiments. Because illustrative embodiments only require data with a priori known resource bounds, illustrative embodiments may carry all device ownership-related metadata with each device ownership transfer request, allowing entirely self-contained in-band annotations. Self-contained in-band annotations allow even stateless filters to reliably monitor device ownership transfer request flows and log device access control operations based on the chain of device ownership alone. The capability to interpret security state of a device is a desirable property of all security-critical systems. Because interactions of the state machine of illustrative embodiments may be observed by chain filters, security enforcement may be "inserted" into device communication paths without changing internals of any deployed device components.

Because illustrative embodiments may be implemented based on public keys and their corresponding digital certificates (i.e., non-sensitive information), the entire process of transferring ownership of a device may be publicly audited. Illustrative embodiments provide well-defined checkpoints for auditable device ownership transfer events for high-assurance environments where all relevant events, such as public key and control lifecycles, must be logged by the set of device ownership registers and optionally time stamped with cryptographic assurance. Illustrative embodiments may be extended to incorporate device trust history in the verification process if the device maintains such a history in an auditable form.

Multiple device controlling entities (e.g., entities authenticated by data corresponding to respective digital signatures) may be added to illustrative embodiments. Assuming digital signature formats, which may contain multiple digital signatures and unambiguously identify them, such as industry-standard signerInfo structures, illustrative embodiments generalize to multiple device controlling entities. Illustrative embodiments may utilize a base system to manage policies and other attributes of multi-signature authentication.

Illustrative embodiments are described above in the scenario of a singular authority and do not elaborate on multi-layered security afforded by a network of public keys, subdividing authority responsibilities. Acknowledging such distinctions may be useful because illustrative embodiments generalize to the management of multiple public keys. As an example, replacing a single device owner with a hierarchy of authorities and authenticating updates through a multi-signature approach, is a straightforward extension of illustrative embodiments. It should be noted that unlike timestamping, illustrative embodiments mark relative time through administrative-signed authentication.

Practical implementations of illustrative embodiments, when deployed with a number of independent, pairwise relationships between cooperating entities (e.g., a single manufacturer of a device supplying multiple integrator entities with the device for further processing), would be deployed with multiple service keys. Pairwise-established service keys or a hierarchical assignment with multiple levels of service keys, which is similar to authorities controlling electronic documents, are both extensions of illustrative embodiments using the concept of service keys.

As a specific application of illustrative embodiments, illustrative embodiments may log functional device changes between production and test software versions, such as to prevent unintended mixing of live and test data. While such distinctions are opaque to illustrative embodiments, illustrative embodiments may present such information to any interested entity, such as an entity with a digital certificate marked with such a distinction. As an example, illustrative embodiments may prevent production environments from starting up with test keys and may control the production environments by ownership-tracking extensions.

Because illustrative embodiments generate audit event records to mark device ownership state transitions for high-assurance applications, illustrative embodiments may allow external entities to contribute data to the audit event records, such as caller-provided data mixed into the audit event record. Therefore, device ownership transfer event records generated by illustrative embodiments may be easy to integrate into hashchain-based or similar logs of other applications. For example, the device ownership transfer event may be bounded in time by inserting externally generated "metronome entries" preceding and following the device ownership transfer event.

Systems controlling firmware updates, such as when authenticating operating system (OS) components, are closely controlled and may only represent synchronized device ownership transfers to known recipient owners. Because many OS-related projects depend on digital certificate/trust-root databases maintained by the OS, these OS-related projects do not easily generalize to interactions with other digital certificates, which implies difficulty of transferring to a digital certificate not already represented.

Illustrative embodiments are described without connections to fine-grained timestamping, which only supplies relative ordering between device ownership transfer events when authenticating a device ownership transfer, for example. If illustrative embodiments need to be extended to track timestamps closer, such as when inferring system date from digital certificate fields to build a monotonously increasing trusted date, illustrative embodiments may implement some of the infrastructure of electronic travel documents where trusted digital certificate fields provide a similar "trusted calendar" service as a side effect.

Typically, trusted digital certificate repositories are updated as any other OS component to reduce security vulnerability windows by automating updates, which is more reliable than manual deployments. Because OS component updates are digitally signed, these updates therefore require known a priori end-user digital certificates when transitioning to new authenticated device ownership control. Because digital certificate repositories are separately managed components, security-related changes may be deployed without changing code, which is also true for illustrative embodiments.

Ownership representation, especially device ownership state evolution of illustrative embodiments, resembles ownership models of low-power RFID tags. However, because illustrative embodiments use public-key cryptography, illustrative embodiments are not restricted to secret-key cryptography and, therefore, the limitations of RFID tags do not apply to illustrative embodiments. As a result, illustrative embodiments do not require any trusted third parties, do not include secret keys within the cryptographically controlled data processing device, and do not need to be concerned about privacy of past device owners because illustrative embodiments are not based on secret keys.

While illustrative embodiments only superficially resemble RFID ownership transfer schemes, illustrative embodiments may adapt two specific technologies from RFID ownership transfer schemes to increase assurance of illustrative embodiments: 1) externally store audit records; and 2) an additional public key handover acknowledging acceptance of ownership. Illustrative embodiments require subsequent device owners to generate redundant transfers of device ownership (i.e., transferring device ownership to themselves) to create auditable device ownership transfer log records.

Figure 3:
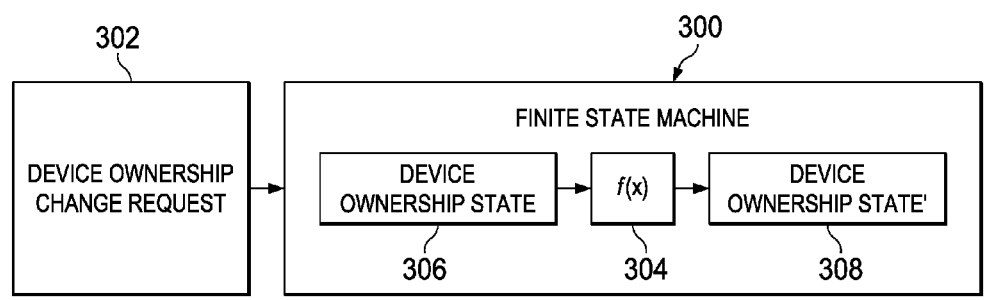
FIG. 3 is a diagram illustrating an example of a finite state machine in accordance with an illustrative embodiment.

With reference now to FIG. 3, a diagram illustrating an example of a finite state machine is depicted in accordance with an illustrative environment. Finite state machine 300 controls transfers of device ownership. In this example, device ownership change request 302 is provided as input to finite state machine 300 controlling transfer of device ownership. Finite state machine 300 then processes device ownership change request 302 using data processing function f(x) 304 and determines whether device ownership state 306 is changed to device ownership state' 308. Device ownership state 306 may be, for example, processor unit 204, current owner register 220, previous owner register 222, designated successor owner 224, and device ownership reversibility control bit 218 in FIG. 2. Examples of other transfers of device ownership by finite state machine 300 are depicted in the example of FIG. 4.

Figure 4:
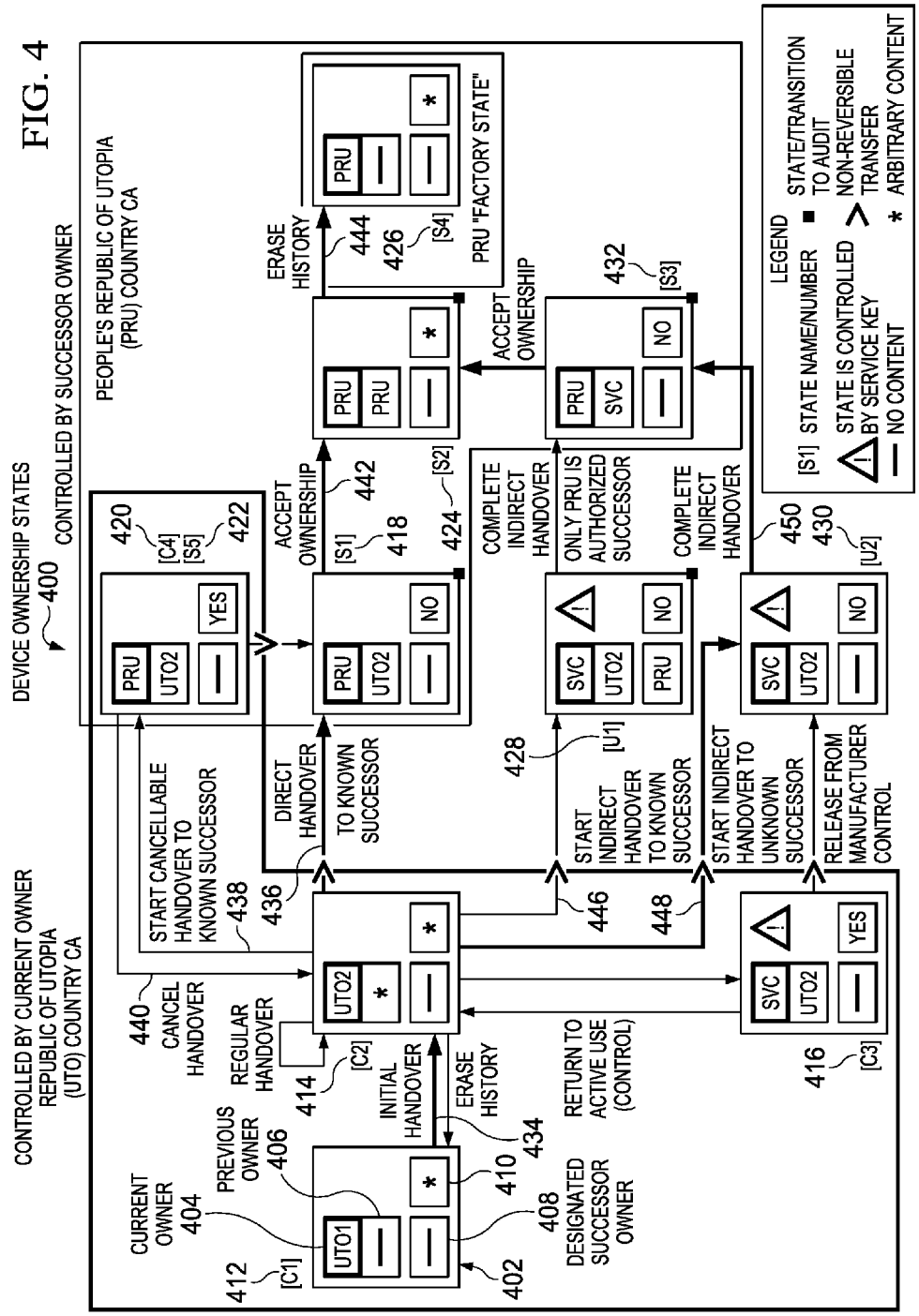
FIG. 4 is a diagram illustrating examples of device ownership states in accordance with an illustrative embodiment.

With reference now to FIG. 4, a diagram illustrating examples of device ownership states is depicted in accordance with an illustrative embodiment. Device ownership states 400 illustrate different device ownership transfer states of device control from a fictional device source entity (i.e., Republic of Utopia (UTO)) to a fictional device recipient entity (i.e., People's Republic of Utopia (PRU)). In this example, UTO1 and UTO2 correspond to different signing public keys controlled by the device source entity; PRU corresponds to the signing public key of the recipient owner entity; and SVC corresponds to the signing public key of a service key, which is shared and known to both the device source entity and the device recipient entity. Device ownership control may pass from UTO to PRU through the different possible states, depending on the policy used.

It should be noted that processor unit 402 is shown in each device ownership state of device ownership states 400. However, it should be noted that processor unit 402 may represent any type of cryptographically controlled data processing device. In this example, processor unit 402 includes current owner register 404, previous owner register 406, designated successor owner 408, and device ownership reversibility control bit 410. Processor unit 402, current owner register 404, previous owner register 406, designated successor owner 408, and device ownership reversibility control bit 410 may be, for example, processor unit 204, current owner register 220, previous owner register 222, designated successor owner 224, and device ownership reversibility control bit 218 in FIG. 2. Alternatively, processor unit 402 may be, for example, finite state machine 300 in FIG. 3. Device ownership states 400 include device ownership states [C1] 412, [C2] 414, [C3] 416, [S1] 418, [C4] 420, [S5] 422, [S2] 424, [S4] 426, [U1] 428, [U2] 430, and [S3] 432.

In a first example, the current device owner UTO maintains control over processor unit 402 (i.e., without a previous device owner or with the current device owner transferring device control at 434 from a previous digital certificate corresponding to UTO1 to a current digital certificate corresponding to UTO2 within the same organization associated with the current owner UTO (see device ownership states [C1] 412 and [C2] 414).

In a second example of device ownership transfer, the current device owner UTO2 transfers device ownership control over to a service key SVC, with the possibility of reversing device ownership from the service key SVC back to the previous owner UTO2 (see device ownership state [C3] 416). It should be noted that the device ownership reversibility control bit is set at device ownership state [C3] 416.

In a third example of device ownership transfer, the device current owner UTO2 directly transfers device ownership control at 436 over to a recipient "successor" device owner PRU, with no possibility of reversing the device ownership transfer, while the recipient successor owner PRU has not yet acknowledged the transfer of device ownership (see device ownership state [S1] 418). It should be noted that the device ownership reversibility control bit is not set at device ownership state [S1] 418. This device ownership state transition also represents a fully online device ownership transfer when the identity of the intended recipient owner is established using an interactive protocol.

In a fourth example of device ownership transfer, the current device owner UTO2 transfers device ownership control at 438 over to a recipient "successor" owner PRU, with the current device owner UTO2 being allowed to reverse the device ownership transfer back to the current owner UTO2 at 440 because the device ownership reversibility control bit is set. It should be noted that this device ownership state is effectively controlled by both digital certificates corresponding to the current device owner and recipient device owner. Consequently, in this example the cryptographically controlled data processing device has two device ownership state designations of [C4] 420 and [S5] 422.

In a fifth example of device ownership transfer, the recipient successor device owner PRU accepts device ownership at 442 by transferring device ownership to its own digital certificate (see device ownership state [S2] 424). In a sixth example of device ownership transfer, the recipient successor device owner PRU at 444 deletes the digital certificate in the previous owner register, such as previous owner register 406, which advances the device into a new "clean" state (see device ownership state [S4] 426). It should be noted that the global digital certificate history chain remains the same, illustrative embodiments only update the current/previous owner pair in the device ownership registers of processor unit 402.

In a seventh example of device ownership transfer, the current device owner UTO2 indirectly transfers device ownership control at 446 over to a known recipient successor device owner by transferring device ownership to a service key SVC and indicating some information about the known recipient successor device owner PRU (see device ownership state [U1] 428). In an eighth example of device ownership transfer, the current device owner UTO2 indirectly transfers device ownership control at 448 using a service key SVC, without possibility of device ownership reversibility because the device ownership reversibility control bit is not set in the device (see device ownership state [U2] 430). It should be noted that any entity authorized to use the service key SVC, including the previous device owner UTO2, may take ownership of the device during this state. Therefore, lack of device ownership reversibility is only a policy restriction.

In an eighth example of device ownership transfer, the current device owner service key SVC completes the indirect device ownership transfer from the service key SVC to a current successor device owner PRU at 450 using an offline-prepared transition certificate from the service key SVC to the current successor device owner PRU (see device ownership state [S3] 432).

Depending on ownership-transfer policies, the cryptographically controlled data processing device passes through different chains of device ownership states during the transitions of transferring ownership of the device. Highlighted arrows in the example of FIG. 4 show typical device ownership transfer transitions for the most frequent scenarios. The example of FIG. 4 also specifically marks non-revertible device ownership transfers because these device ownership state changes correspond to externally trustworthy, auditable events. In addition, the example of FIG. 4 similarly marks device ownership states that are controlled by service keys, where device ownership is effectively shared by the previous device owner and the designated successor device owner.

An example of direct device ownership transfer by directly replacing owner digital certificates is shown in device ownership chain of states [C1] 412, [C2] 414, [S1] 418, [S2] 424, and [S4] 426. An example of direct device ownership transfer with a capability of device ownership reversibility is shown in the device ownership chain of states [C1] 412, [C2] 414, [C4] 420/[S5] 422, [S1] 418, [S2] 424, and [S4] 426. While in the device ownership state [C4] 420/[S5] 422, the device is effectively controlled by both the previous owner UTO2 and the current successor owner PRU. When the previous owner UTO2 cancels or rolls back the device ownership transfer at device ownership state [C4] 420/[S5] 422, device ownership passes back to UTO2 at device ownership state [C2] 414.

An example of indirect device ownership transfer to a designated successor device owner without the capability of device ownership reversibility is shown in device ownership chain of states [C1] 412, [C2] 414, [U1] 428, [S3] 432, [S2] 424, and [S4] 426. This example of indirect device ownership transfer allows offline construction of service key-to-PRU device ownership transition digital certificates, while still preventing unauthorized entities from taking ownership control at the service key SVC device ownership state [U1] 428.

An example of indirect device ownership transfer to any target recipient device owner using a service key SVC is shown in device ownership chain of states [C1] 412, [C2] 414, [U2] 430, [S3] 432, [S2] 424, and [S4] 426. This chain of states may optionally include [C3] 416 on the [C1] 412, [C2] 414, [C3] 416, [U2] 430, [S3] 432, [S2] 424, and [S4] 426 chain of states, when the originator of the device ownership transfer (i.e., previous owner UTO2) wishes to explicitly mark transfer of device ownership to a shared device ownership represented by the service key SVC. While functionally the intermediate device ownership state [C3] 416 is not relevant, the intermediate device ownership state [C3] 416 allows an auditable handover when the originator of the device ownership transfer intends to show an explicit start of device ownership transfer. For example, a manufacturer may mark a device in inventory as intended for use by a subsequent entity. The only difference between device ownership state [C3] 416 and device ownership state [U2] 430 is the capability of rolling back device ownership from current owner service key SVC to previous owner UTO2, allowing the originator of the device ownership transfer (i.e., UTO2) to take back the device to its control, without using the service key SVC.

Figure 5B:
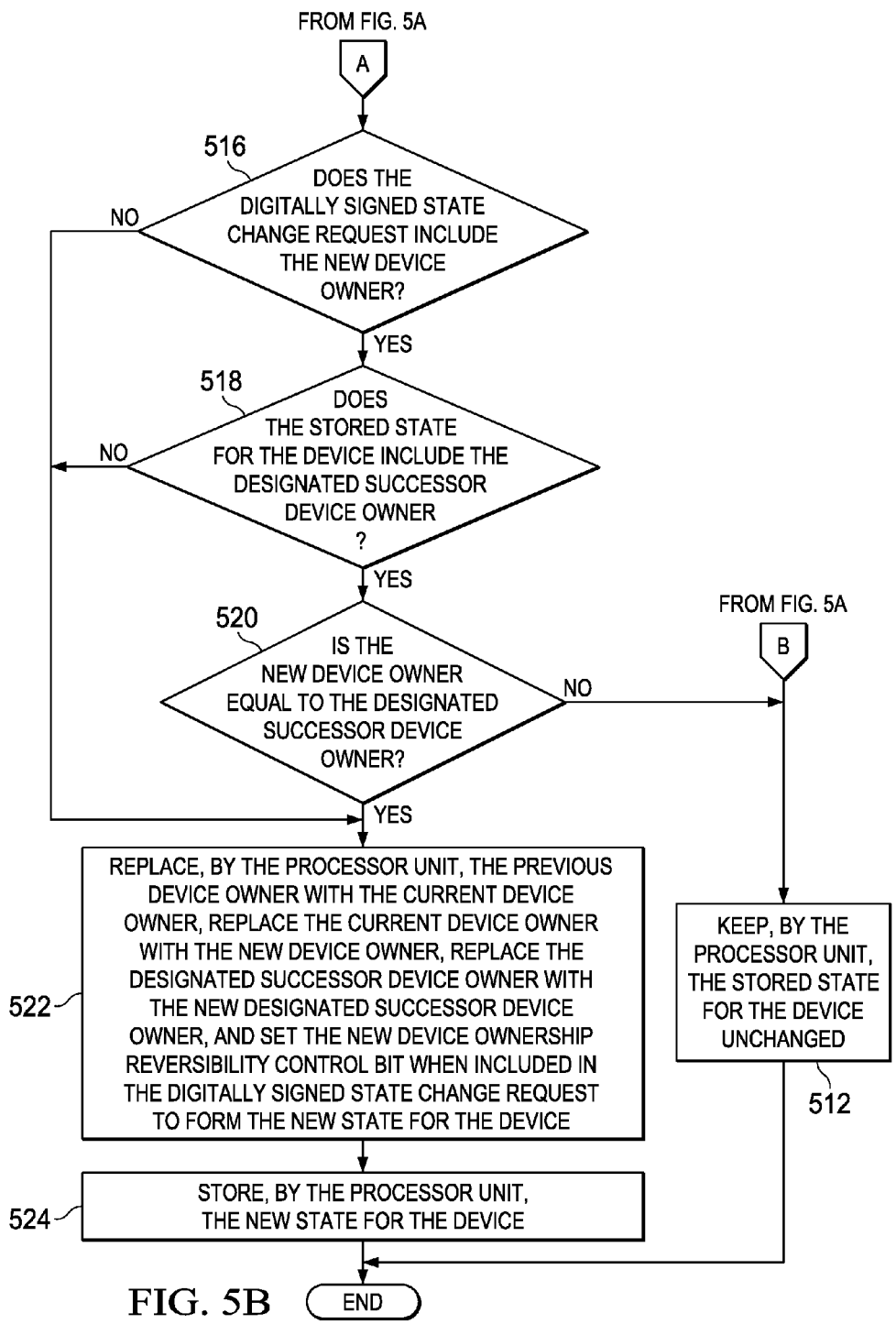

With reference now to FIGS. 5A-5B, a flowchart illustrating a process for managing transfer of device ownership is shown in accordance with an illustrative embodiment. The process shown in FIGS. 5A-5B may be implemented in a device, such as, for example, data processing system 200 in FIG. 2.

The process begins when a processor unit of the device, such as processor unit 204 in FIG. 2, accepts a digitally signed state change request for the device that includes at least one of a new device owner, a new designated successor device owner, and a new device ownership reversibility control bit (step 502). The processor unit reads a stored state for the device that includes at least one of a current device owner, a previous device owner, a designated successor device owner, and a current device ownership reversibility control bit (step 504). The processor unit also verifies a digital signature of the digitally signed state change request (step 506).

Afterward, the processor unit makes a determination as to whether the digital signature corresponds to the current device owner (step 508). If the processor unit determines that the digital signature does not correspond to the current device owner, no output of step 508, then the processor unit makes a determination as to whether the current device ownership reversibility control bit is set (step 510). If the processor determines that the current device ownership reversibility control bit is not set, no output of step 510, then the processor unit keeps the stored state for the device unchanged (step 512) and the process terminates thereafter. If the processor unit determines that the current device ownership reversibility control bit is set, yes output of step 510, then the processor unit makes a determination as to whether the digital signature corresponds to the previous device owner (step 514). If the processor unit determines that the digital signature does not correspond to the previous device owner, no output of step 514, then the process returns to step 512 where the processor unit keeps the stored state for the device unchanged and the process terminates thereafter. If the processor unit determines that the digital signature does correspond to the previous device owner, yes output of step 514, then the process proceeds to step 516. Returning again to step 508, if the processor unit determines that the digital signature does correspond to the current device owner, yes output of step 508, then the processor unit makes a determination as to whether the digitally signed state change request includes the new device owner (step 516).

If the processor unit determines that the digitally signed state change request does not include the new device owner, no output of step 516, then the process proceeds to step 522. If the processor unit determines that the digitally signed state change request does include the new device owner, yes output of step 516, then the processor unit makes a determination as to whether the stored state for the device includes the designated successor device owner (step 518).

If the processor unit determines that the stored state for the device does not include the designated successor device owner, no output of step 518, then the process proceeds to step 522. If the processor unit determines that the stored state for the device does include the designated successor device owner, yes output of step 518, then the processor unit makes a determination as to whether the new device owner is equal to the designated successor device owner (step 520).

If the processor unit determines that the new device owner is not equal to the designated successor device owner, no output of step 520, then the process returns to step 512 where the processor unit keeps the stored state for the device unchanged. If the processor unit determines that the new device owner is equal to the designated successor device owner, yes output of step 520, then the processor unit replaces the previous device owner with the current device owner, replaces the current device owner with the new device owner, replaces the designated successor device owner with the new designated successor device owner, and sets the new device ownership reversibility control bit when included in the digitally signed state change request to form the new state for the device (step 522). In addition, the processor unit stores the new state for the device (step 524). Thereafter, the process terminates.

Figure 6:
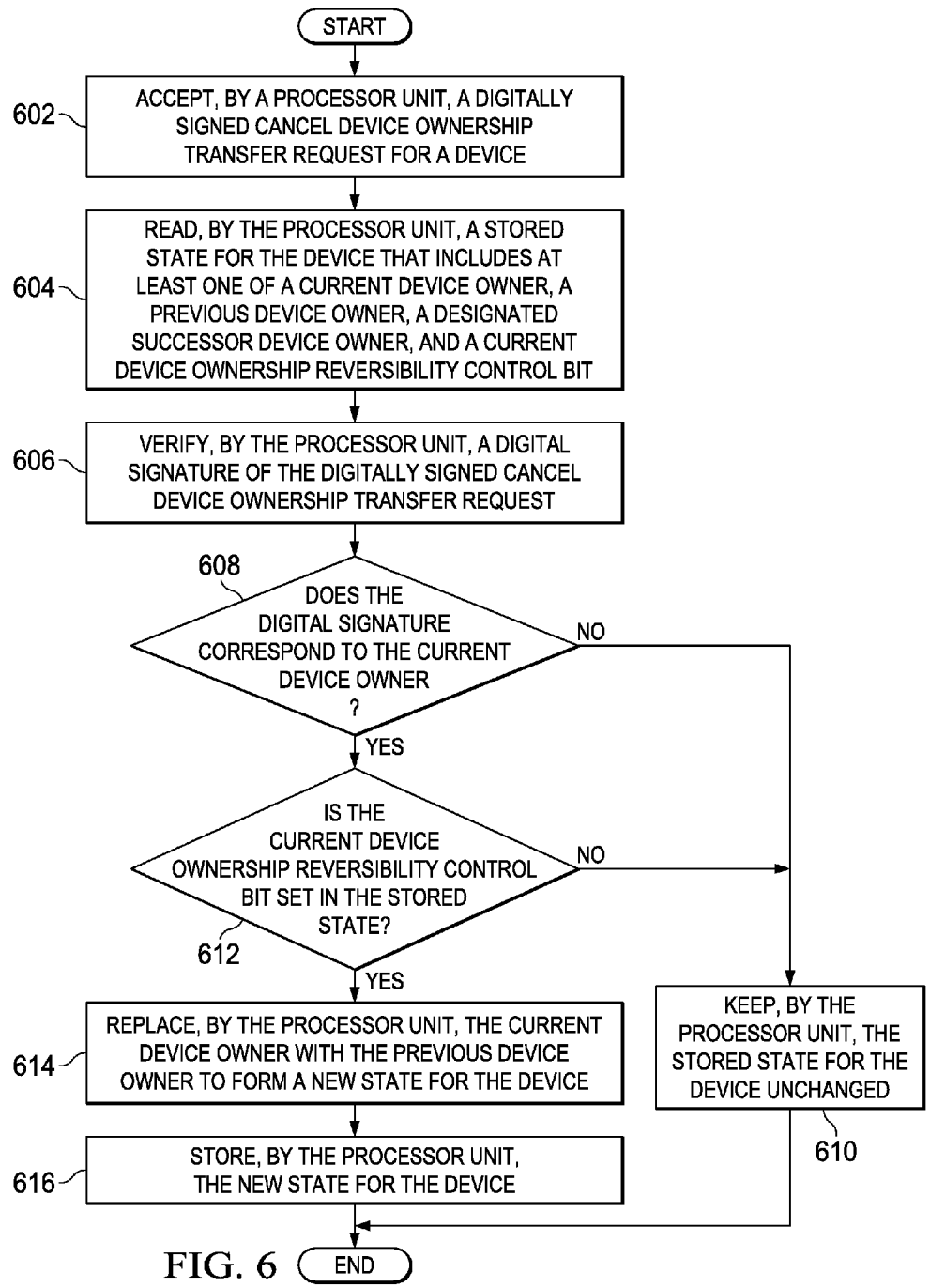
FIG. 6 is a flowchart illustrating a process for reverting device ownership to a previous owner in accordance with an illustrative embodiment.

With reference now to FIG. 6, a flowchart illustrating a process for reverting device ownership to a previous owner is shown in accordance with an illustrative embodiment. The process shown in FIG. 6 may be implemented in a device, such as, for example, data processing system 200 in FIG. 2.

The process begins when a processor unit of the device, such as processor unit 204 in FIG. 2, accepts a digitally signed cancel device ownership transfer request for the device (step 602). The processor unit reads a stored state for the device that includes at least one of a current device owner, a previous device owner, a designated successor device owner, and a current device ownership reversibility control bit (step 604). The processor unit also verifies a digital signature of the digitally signed cancel device ownership transfer request (step 606).

Afterward, the processor unit makes a determination as to whether the digital signature corresponds to the current device owner (step 608). If the processor unit determines that the digital signature does not correspond to the current device owner, no output of step 608, then the processor unit keeps the stored state for the device unchanged (step 610) and the process terminates thereafter. If the processor unit determines that the digital signature does correspond to the current device owner, yes output of step 608, then the processor unit makes a determination as to whether the current device ownership reversibility control bit is set in the stored state (step 612).

If the processor unit determines that the current device ownership reversibility control bit is not set in the stored state, no output of step 612, then the process returns to step 610 where the processor unit keeps the stored state for the device unchanged. If the processor unit determines that the current device ownership reversibility control bit is set in the stored state, yes output of step 612, then the processor unit replaces the current device owner with the previous device owner to form a new state for the device (step 614). In addition, the processor unit stores the new state for the device (step 616). Thereafter, the process terminates.

Figure 7:
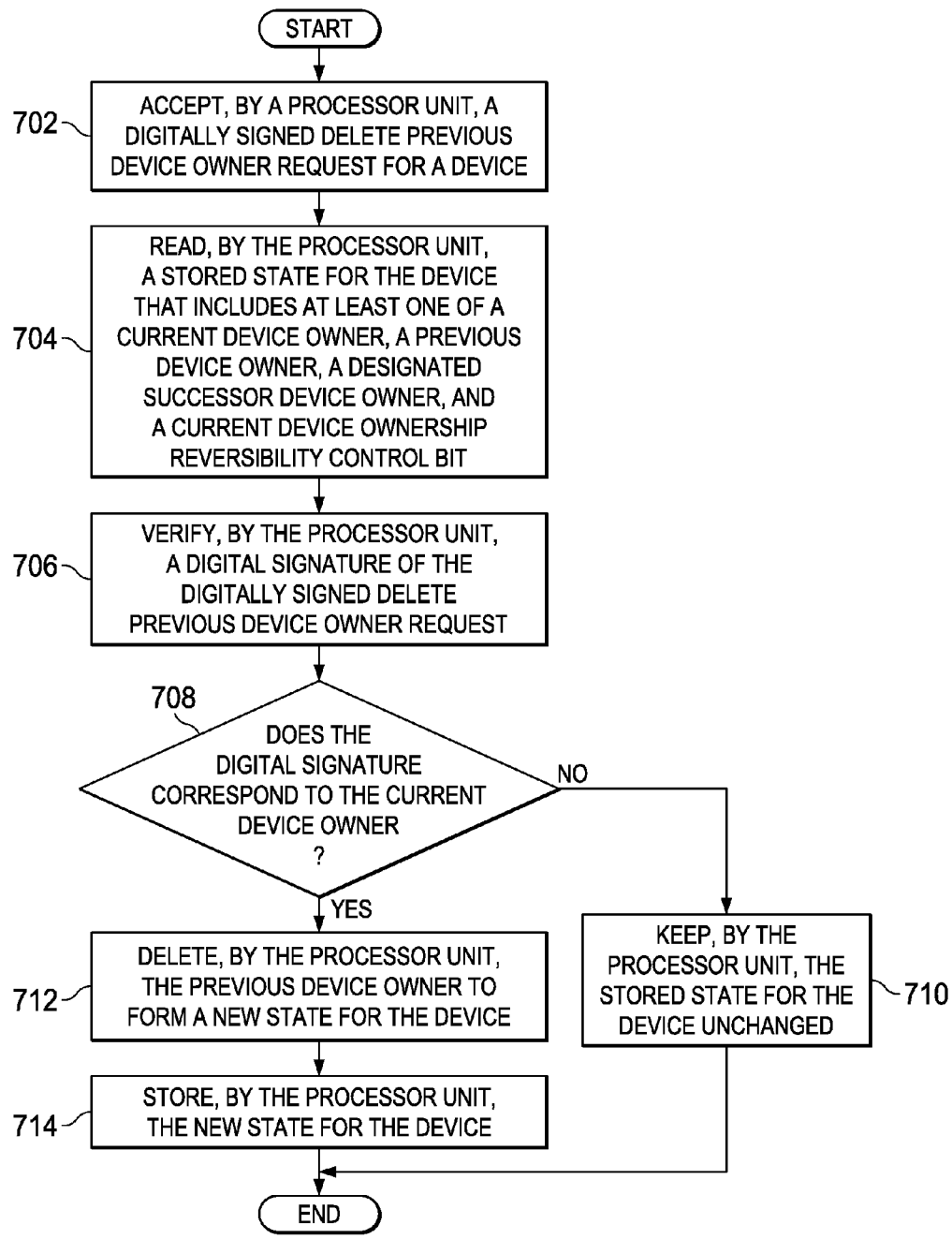
FIG. 7 is a flowchart illustrating a process for deleting device ownership history in accordance with an illustrative embodiment.

With reference now to FIG. 7, a flowchart illustrating a process for deleting device ownership history is shown in accordance with an illustrative embodiment. The process shown in FIG. 7 may be implemented in a device, such as, for example, data processing system 200 in FIG. 2.

The process begins when a processor unit of the device, such as processor unit 204 in FIG. 2, accepts a digitally signed delete previous device owner request for the device (step 702). The processor unit reads a stored state for the device that includes at least one of a current device owner, a previous device owner, a designated successor device owner, and a current device ownership reversibility control bit (step 704). The processor unit also verifies a digital signature of the digitally signed delete previous device owner request (step 706).

Afterward, the processor unit makes a determination as to whether the digital signature corresponds to the current device owner (step 708). If the processor unit determines that the digital signature does not correspond to the current device owner, no output of step 708, then the processor unit keeps the stored state for the device unchanged (step 710) and the process terminates thereafter. If the processor unit determines that the digital signature does correspond to the current device owner, yes output of step 708, then the processor unit deletes the previous device owner to form a new state for the device (step 712). In addition, the processor unit stores the new state for the device (step 714).

Figure 8:
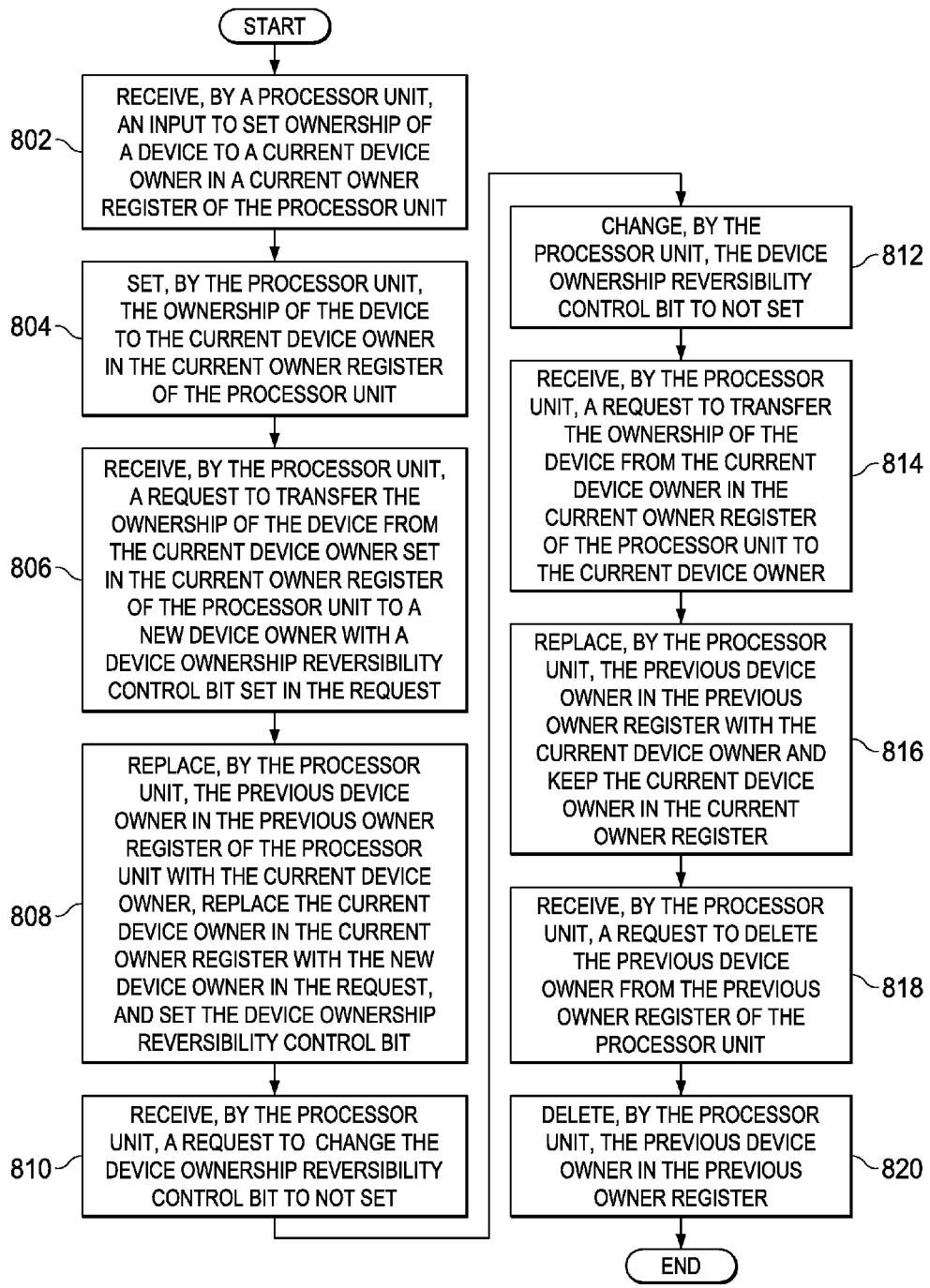
FIG. 8 is a flowchart illustrating a process for direct device ownership transfer that is reversible in accordance with an illustrative embodiment.

With reference now to FIG. 8, a flowchart illustrating a process for direct device ownership transfer that is reversible is shown in accordance with an illustrative embodiment. The process shown in FIG. 8 may be implemented in a device, such as, for example, data processing system 200 in FIG. 2. The process shown in FIG. 8 also may be implemented in a device ownership chain of states, such as, for example, device ownership chain of states [C1] 412, [C2] 414, [C4] 420/[S5] 422, [S1] 418, [S2] 424, and [S4] 426 in FIG. 4.

The process begins when a processor unit of the device, such as processor unit 204 in FIG. 2, receives an input to set ownership of the device to a current device owner in a current owner register of the processor unit (step 802). Afterward, the processor unit sets the ownership of the device to the current device owner in the current owner register of the processor unit (step 804). Subsequently, the processor unit receives a request to transfer the ownership of the device from the current device owner set in the current owner register of the processor unit to a new device owner with a device ownership reversibility control bit set in the request (step 806). The processor unit replaces a previous device owner in a previous owner register of the processor unit with the current device owner, replaces the current device owner in the current owner register with the new device owner in the request, and sets the device ownership reversibility control bit (step 808).

Subsequently, the processor unit receives a request to change the reversibility control bit to not set (step 810). The processor unit changes the reversibility control bit to not set (step 812).

Subsequently, the processor unit receives a request to transfer the ownership of the device from the current device owner in the current owner register of the processor unit to the current device owner (step 814). The processor unit replaces the previous device owner in the previous owner register with the current device owner and keeps the current device owner in the current owner register (step 816).

Subsequently, the processor unit receives a request to delete the previous device owner from the previous owner register of the processor unit (step 818). The processor unit deletes the previous device owner in the previous owner register (step 820). Thereafter, the process terminates. However, it should be noted with regard to FIGS. 8-12 that after each "set," "change," and "replace" step, the processor unit saves the current state of the device.

Figure 9:
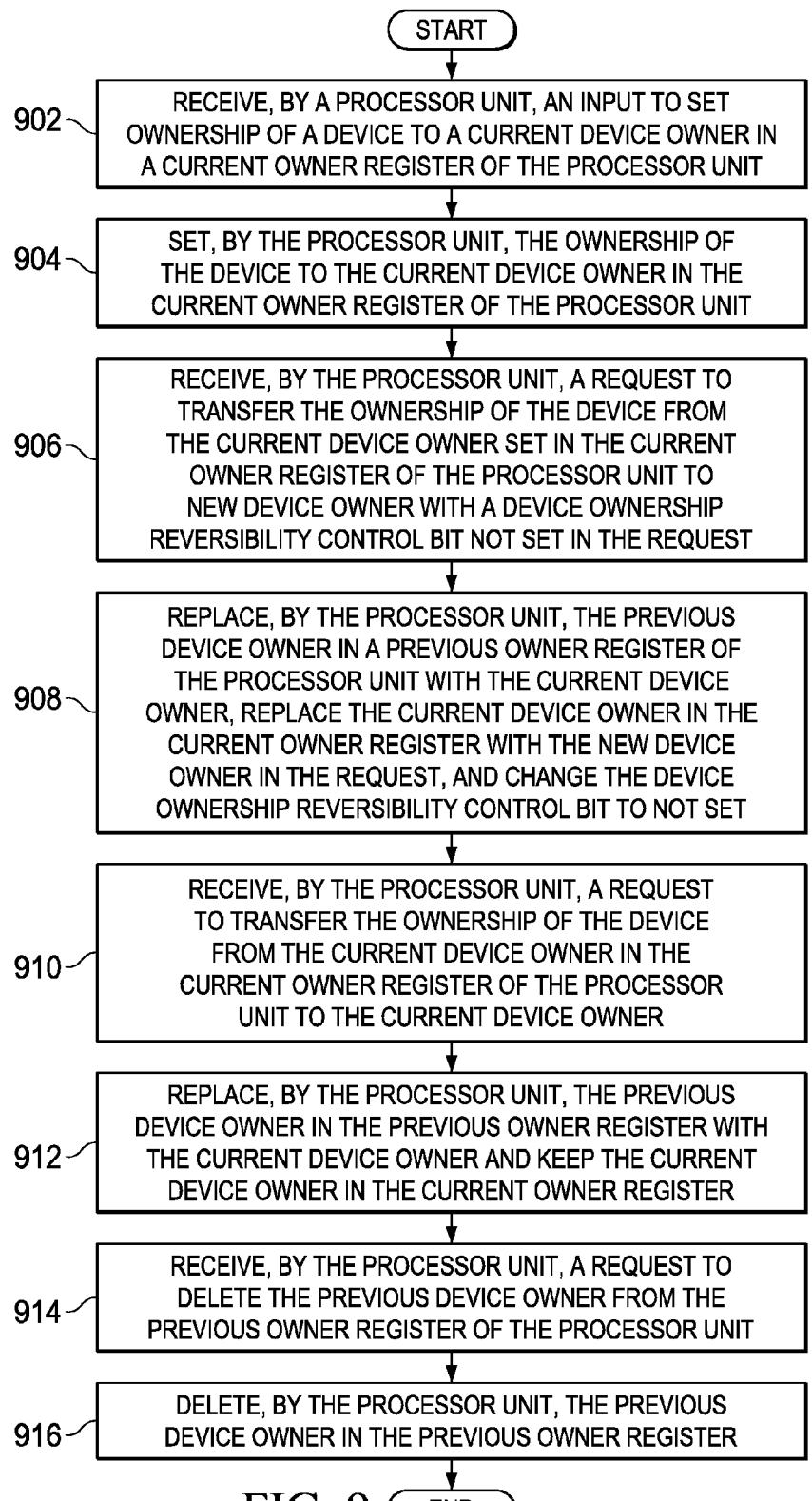
FIG. 9 is a flowchart illustrating a process for direct device ownership transfer that is irreversible in accordance with an illustrative embodiment.

With reference now to FIG. 9, a flowchart illustrating a process for direct device ownership transfer that is irreversible is shown in accordance with an illustrative embodiment. The process shown in FIG. 9 may be implemented in a device, such as, for example, data processing system 200 in FIG. 2. The process shown in FIG. 9 also may be implemented in a device ownership chain of states, such as, for example, device ownership chain of states [C1] 412, [C2] 414, [S1] 418, [S2] 424, and [S4] 426 in FIG. 4.

The process begins when a processor unit of the device, such as processor unit 204 in FIG. 2, receives an input to set ownership of the device to a current device owner in a current owner register of the processor unit (step 902). Afterward, the processor unit sets the ownership of the device to the current device owner in the current owner register of the processor unit (step 904). Subsequently, the processor unit receives a request to transfer the ownership of the device from the current device owner set in the current owner register of the processor unit to a new device owner with a device ownership reversibility control bit not set in the request (step 906). The processor unit replaces a previous device owner in a previous owner register of the processor unit with the current device owner, replaces the current device owner in the current owner register with the new device owner in the request, and changes the device ownership reversibility control bit to not set (step 908).

Subsequently, the processor unit receives a request to transfer the ownership of the device from the current device owner in the current owner register of the processor unit to the current device owner (step 910). The processor unit replaces the previous device owner in the previous owner register with the current device owner and keeps the current device owner in the current owner register (step 912).

Subsequently, the processor unit receives a request to delete the previous device owner from the previous owner register of the processor unit (step 914). The processor unit deletes the previous device owner in the previous owner register (step 916). Thereafter, the process terminates.

Figure 10:
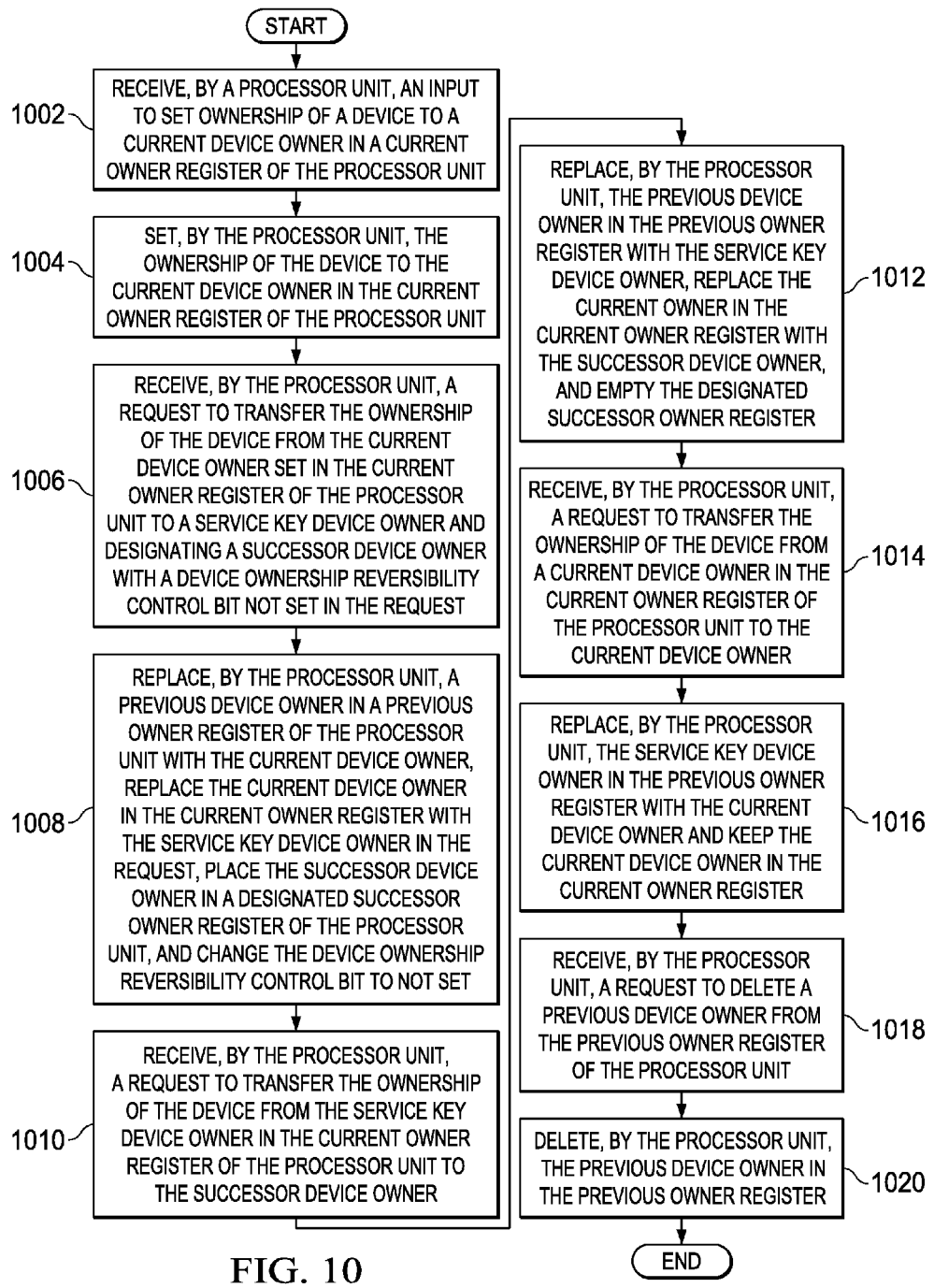
FIG. 10 is a flowchart illustrating a process for indirect device ownership transfer to a designated successor in accordance with an illustrative embodiment.

With reference now to FIG. 10, a flowchart illustrating a process for indirect device ownership transfer to a designated successor is shown in accordance with an illustrative embodiment. The process shown in FIG. 10 may be implemented in a device, such as, for example, data processing system 200 in FIG. 2. The process shown in FIG. 10 also may be implemented in a device ownership chain of states, such as, for example, device ownership chain of states [C1] 412, [C2] 414, [U1] 428, [S3] 432, [S2] 424, and [S4] 426 in FIG. 4.

The process begins when a processor unit of the device, such as processor unit 204 in FIG. 2, receives an input to set ownership of the device to a current device owner in a current owner register of the processor unit (step 1002). Afterward, the processor unit sets the ownership of the device to the current device owner in the current owner register of the processor unit (step 1004). Subsequently, the processor unit receives a request to transfer the ownership of the device from the current device owner set in the current owner register of the processor unit to a service key device owner and designates a successor device owner with a device ownership reversibility control bit not set in the request (step 1006). The processor unit replaces a previous device owner in a previous owner register of the processor unit with the current device owner, replaces the current device owner in the current owner register with the service key device owner in the request, places the successor device owner in a designated successor owner register of the processor unit, and changes the device ownership reversibility control bit to not set (step 1008).

Subsequently, the processor unit receives a request to transfer the ownership of the device from the service key device owner in the current owner register of the processor unit to the successor device owner (step 1010). The processor unit replaces the previous device owner in the previous owner register with the service key device owner, replaces the current owner in the current owner register with the successor device owner, and empties the designated successor owner register (step 1012).

Subsequently, the processor unit receives a request to transfer the ownership of the device from a current device owner in the current owner register of the processor unit to the current device owner (step 1014). The processor unit replaces the service key device owner in the previous owner register with the current device owner and keeps the current device owner in the current owner register (step 1016).

Subsequently, the processor unit receives a request to delete a previous device owner from the previous owner register of the processor unit (step 1018). The processor unit deletes the previous device owner in the previous owner register (step 1020). Thereafter, the process terminates.

Figure 11:
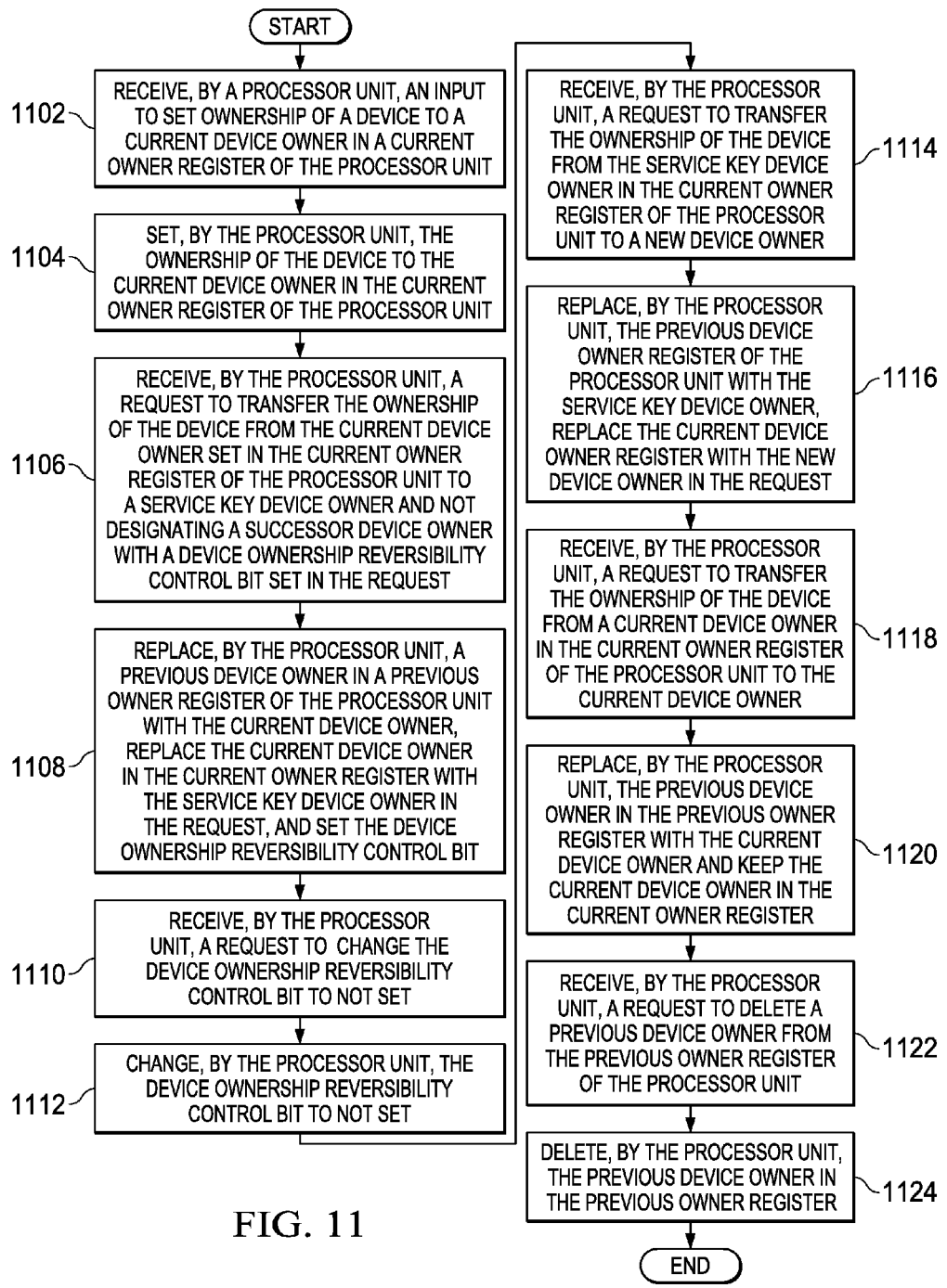
FIG. 11 is a flowchart illustrating a process for indirect device ownership transfer to an unknown successor in accordance with an illustrative embodiment.

With reference now to FIG. 11, a flowchart illustrating a process for indirect device ownership transfer to an unknown successor is shown in accordance with an illustrative embodiment. The process shown in FIG. 11 may be implemented in a device, such as, for example, data processing system 200 in FIG. 2. The process shown in FIG. 11 also may be implemented in a device ownership chain of states, such as, for example, device ownership chain of states [C1] 412, [C2] 414, [C3] 416, [U2] 430, [S3] 432, [S2] 424, and [S4] 426 in FIG. 4.

The process begins when a processor unit of the device, such as processor unit 204 in FIG. 2, receives an input to set ownership of the device to a current device owner in a current owner register of the processor unit (step 1102). Afterward, the processor unit sets the ownership of the device to the current device owner in the current owner register of the processor unit (step 1104). Subsequently, the processor unit receives a request to transfer the ownership of the device from the current device owner set in the current owner register of the processor unit to a service key device owner and does not designate a successor device owner with a device ownership reversibility control bit set in the request (step 1106). The processor unit replaces a previous device owner in a previous owner register of the processor unit with the current device owner, replaces the current device owner in the current owner register with the service key device owner in the request, and sets the device ownership reversibility control bit (step 1108).

Subsequently, the processor unit receives a request to change the device ownership reversibility control bit to not set (step 1110). The processor unit then changes the device ownership reversibility control bit to not set (step 1112).

Subsequently, the processor unit receives a request to transfer the ownership of the device from the service key device owner in the current owner register of the processor unit to a new device owner (step 1114). The processor unit replaces the previous device owner in the previous owner register with the service key device owner and replaces the current owner in the current owner register with the new device owner in the request (step 1116).

Subsequently, the processor unit receives a request to transfer the ownership of the device from a current device owner in the current owner register of the processor unit to the current device owner (step 1118). The processor unit replaces the service key device owner in the previous owner register with the current device owner and keeps the current device owner in the current owner register (step 1120).

Subsequently, the processor unit receives a request to delete a previous device owner from the previous owner register of the processor unit (step 1122). The processor unit deletes the previous device owner in the previous owner register (step 1124). Thereafter, the process terminates.

Figure 12:
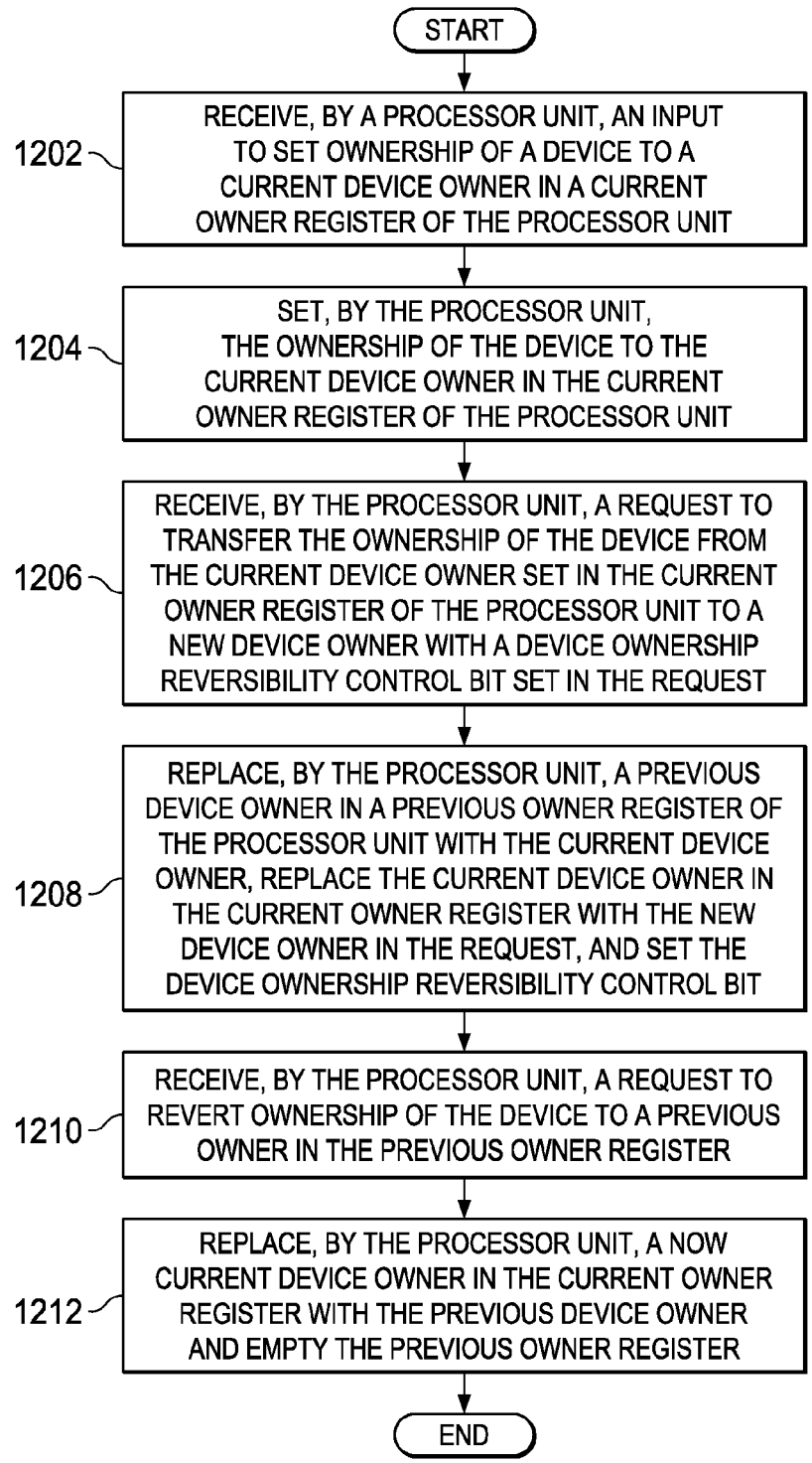
FIG. 12 is a flowchart illustrating a process for returning a device to a previous owner's inventory in accordance with an illustrative embodiment.

With reference now to FIG. 12, a flowchart illustrating a process for returning a device to a previous owner's inventory is shown in accordance with an illustrative embodiment. The process shown in FIG. 12 may be implemented in a device, such as, for example, data processing system 200 in FIG. 2. The process shown in FIG. 12 also may be implemented in a device ownership chain of states, such as, for example, device ownership chain of states [C1] 412, [C2] 414, [C3] 416, and [C2] 414 or device ownership chain of states [C1] 412, [C2] 414, [C4] 420/[S5] 422, and [C2] 414 in FIG. 4.

The process begins when a processor unit of the device, such as processor unit 204 in FIG. 2, receives an input to set ownership of the device to a current device owner in a current owner register of the processor unit (step 1202). Afterward, the processor unit sets the ownership of the device to the current device owner in the current owner register of the processor unit (step 1204). Subsequently, the processor unit receives a request to transfer the ownership of the device from the current device owner set in the current owner register of the processor unit to a new device owner with a device ownership reversibility control bit set in the request (step 1206). The processor unit replaces a previous device owner in a previous owner register of the processor unit with the current device owner, replaces the current device owner in the current owner register with the new device owner in the request, and sets the device ownership reversibility control bit (step 1208).

Subsequently, the processor unit receives a request to revert ownership of the device to a previous owner in the previous owner register (step 1210). The processor unit replaces a now current device owner in the current owner register with the previous device owner and empties the previous owner register (step 1212). Thereafter, the process terminates.

Thus, illustrative embodiments of the present invention provide a computer-implemented method, data processing system, and computer program product for managing transfer of ownership of a cryptographically controlled data processing device using public keys corresponding to current, previous, and designated successor owners. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing transfer of device ownership, the computer-implemented method comprising:

accepting, by a processor, a digitally signed state change request for a device that includes at least one of a new device owner, a new designated successor device owner, and a new device ownership reversibility control bit;

reading, by the processor, a stored state for the device that includes at least one of a current device owner, a previous device owner, a designated successor device owner, and a current device ownership reversibility control bit; and replacing, by the processor, the previous device owner with the current device owner, replacing the current device owner with the new device owner, replacing the designated successor device owner with the new designated successor device owner, and setting the new device ownership reversibility control bit in response to the new device ownership reversibility control bit being included in the digitally signed state change request.

2. The computer-implemented method of claim 1 further comprising:

verifying, by the processor, a digital signature of the digitally signed state change request;

determining, by the processor, whether the digital signature corresponds to the current device owner; and responsive to the processor determining that the digital signature does not correspond to the current device owner, keeping, by the processor, the stored state for the device unchanged.

3. The computer-implemented method of claim 2 further comprising:

responsive to the processor determining that the digital signature does correspond to the current device owner, determining, by the processor, whether the digitally signed state change request includes the new device owner;

responsive to the processor determining that the digitally signed state change request does include the new device owner, determining, by the processor, whether the stored state for the device includes the designated successor device owner; and wherein replacing, by the processor, the previous device owner with the current device owner, replacing the current device owner with the new device owner, and setting the new device ownership reversibility control bit in response to the new device ownership reversibility control bit being included in the digitally signed state change request are performed responsive to the processor determining that the stored state for the device does not include the designated successor device owner.

4. The computer-implemented method of claim 1 further comprising:
accepting, by the processor, a digitally signed cancel device ownership transfer request for the device; and
responsive to accepting the digitally signed cancel device ownership transfer request for the device, replacing, by the processor, the current device owner with the previous device owner.

5. The computer-implemented method of claim 4 further comprising:
verifying, by the processor, a digital signature of the digitally signed cancel device ownership transfer request; and
determining, by the processor, whether the digital signature corresponds to the current device owner; and
determining, by the processor, whether the current device reversibility control bit is set.

6. The computer-implemented method of claim 1 further comprising:
accepting, by the processor, a digitally signed delete previous device owner request for the device; and
responsive to accepting the digitally signed delete previous device owner request for the device, deleting, by the processor, the previous device owner.

7. The computer-implemented method of claim 6 further comprising:
verifying, by the processor, a digital signature of the digitally signed delete previous device owner request; and
determining, by the processor, whether the digital signature corresponds to the current device owner.

8. The computer-implemented method of claim 1 further comprising:
receiving, by the processor, an input to set ownership of the device to the current device owner in a current owner register of the processor; and
responsive to receiving the input to set ownership of the device to the current device owner in the current owner register of the processor, setting, by the processor, the ownership of the device to the current device owner in the current owner register of the processor.

9. The computer-implemented method of claim 1 further comprising:
receiving, by the processor, a request to transfer the ownership of the device from the current device owner set in a current owner register of the processor to the new device owner; and
responsive to receiving the request to transfer the ownership of the device from the current device owner set in the current owner register of the processor to the new device owner, placing, by the processor, the current device owner in a previous owner register of the processor and replacing the current device owner in the current owner register with the new device owner.

10. The computer-implemented method of claim 1 further comprising:
receiving, by the processor, a request to transfer ownership of the device from the current device owner in a current owner register of the processor to the current device owner; and
responsive to receiving the request to transfer ownership of the device from the current device owner in the current owner register of the processor to the current device owner, replacing, by the processor, the previous device owner in a previous owner register of the processor with the current device owner and keeping the current device owner in the current owner register.

11. The computer-implemented method of claim 1 further comprising:
receiving, by the processor, a request to delete the previous device owner from a previous owner register of the processor; and
responsive to receiving the request to delete the previous device owner from a previous owner register of the processor, deleting, by the processor, the previous device owner in the previous owner register of the processor.

12. The computer-implemented method of claim 1 further comprising:
receiving, by the processor, a request to transfer ownership of the device from the current device owner set in a current owner register of the processor to a service key device owner and designate the new successor device owner; and
responsive to receiving the request to transfer ownership of the device from the current device owner set in the current owner register of the processor to the service key device owner and designate the new successor device owner, replacing, by the processor, the current device owner in the current owner register of the processor with the service key device owner, placing the current device owner in a previous owner register of the processor, and placing the new successor device owner in a designated successor owner register of the processor.

13. The computer-implemented method of claim 1 further comprising:
receiving, by the processor, a request to transfer ownership of the device from a service key device owner in a current owner register of the processor to the successor device owner in a designated successor owner register of the processor; and
responsive to receiving the request to transfer ownership of the device from the service key device owner in the current owner register of the processor to the successor device owner in the designated successor owner register of the processor, replacing, by the processor, the service key device owner in the current owner register with the successor device owner, placing the service key device owner in a previous owner register of the processor, and emptying the designated successor owner register of the processor.

14. The computer-implemented method of claim 1 further comprising:
receiving, by the processor, a request to revert ownership of the device to the previous device owner in a previous owner register of the processor;
determining, by the processor, whether the reversibility control bit is set;
verifying, by the processor, a digital signature of the request to revert ownership of the device to the previous device owner;
determining, by the processor, whether the digital signature corresponds to the previous device owner; and
responsive to the processor determining that the reversibility control bit is set and determining that the digital signature corresponds to the previous device owner, replacing, by the processor, the current device owner in a current owner register of the processor with the previous device owner and emptying the previous owner register of the processor.

15. A data processing system for managing transfer of device ownership, the data processing system comprising:
a bus system;
a storage device connected to the bus system, wherein the storage device stores program instructions; and
a processor connected to the bus system, wherein the processor executes the program instructions to:
accept a digitally signed state change request for the data processing system that includes at least one of a new device owner, a new designated successor device owner, and a new device ownership reversibility control bit;
read a stored state for the data processing system that includes at least one of a current device owner, a previous device owner, a designated successor device owner, and a current device ownership reversibility control bit; and
replace the previous device owner with the current device owner, replace the current device owner with the new device owner, replace the designated successor device owner with the new designated successor device owner, and set the new device ownership reversibility control bit in response to the new device ownership reversibility control bit being included in the digitally signed state change request.

16. The data processing system of claim 15, wherein the processor further executes the program instructions to:
verify a digital signature of the digitally signed state change request;
determine whether the digital signature corresponds to the current device owner; and
keep the stored state for the data processing system unchanged in response to determining that the digital signature does not correspond to the current device owner.

17. A computer program product for managing transfer of device ownership, the computer program product comprising a non-transitory computer readable storage medium having program instructions embodied therewith, the program instructions executable by a processor to cause the processor to perform a method comprising:
accepting, by the processor, a digitally signed state change request for a device that includes at least one of a new device owner, a new designated successor device owner, and a new device ownership reversibility control bit;
reading, by the processor, a stored state for the device that includes at least one of a current device owner, a previous device owner, a designated successor device owner, and a current device ownership reversibility control bit; and
replacing, by the processor, the previous device owner with the current device owner, replacing the current device owner with the new device owner, replacing the designated successor device owner with the new designated successor device owner, and setting the new device ownership reversibility control bit in response to the new device ownership reversibility control bit being included in the digitally signed state change request.

18. The computer program product of claim 17 further comprising:
verifying, by the processor, a digital signature of the digitally signed state change request;
determining, by the processor, whether the digital signature corresponds to the current device owner; and
responsive to the processor determining that the digital signature does not correspond to the current device owner, keeping, by the processor, the stored state for the device unchanged.

19. The computer program product of claim 18 further comprising:
responsive to the processor determining that the digital signature does correspond to the current device owner, determining, by the processor, whether the digitally signed state change request includes the new device owner;
responsive to the processor determining that the digitally signed state change request does include the new device owner, determining, by the process, whether the stored state for the device includes the designated successor device owner; and
wherein replacing, by the processor, the previous device owner with the current device owner, replacing the current device owner with the new device owner, and setting the new device ownership reversibility control bit in response to the new device ownership reversibility control bit being included in the digitally signed state change request are performed responsive to the processor determining that the stored state for the device does not include the designated successor device owner.

20. The computer program product of claim 17 further comprising:
accepting, by the processor, a digitally signed cancel device ownership transfer request for the device; and
responsive to accepting the digitally signed cancel device ownership transfer request for the device, replacing, by the processor, the current device owner with the previous device owner.

* * * * *